(12) United States Patent
Cho et al.

(10) Patent No.: US 9,367,409 B2
(45) Date of Patent: Jun. 14, 2016

(54) METHOD AND SYSTEM FOR HANDLING FAILURES BY TRACKING STATUS OF SWITCHOVER OR SWITCHBACK

(71) Applicant: NetApp, Inc., Sunnyvale, CA (US)

(72) Inventors: Yong Eun Cho, Saratoga, CA (US); Anuja Jaiswal, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 156 days.

(21) Appl. No.: 14/266,807

(22) Filed: Apr. 30, 2014

(65) Prior Publication Data

US 2015/0317223 A1 Nov. 5, 2015

(51) Int. Cl.
  *G06F 11/00* (2006.01)
  *G06F 11/20* (2006.01)
  *G06F 11/14* (2006.01)
  *G06F 11/07* (2006.01)

(52) U.S. Cl.
  CPC ........ *G06F 11/2033* (2013.01); *G06F 11/0727* (2013.01); *G06F 11/1417* (2013.01); *G06F 11/2094* (2013.01)

(58) Field of Classification Search
  CPC ............ G06F 11/2033; G06F 11/1417; G06F 11/2094; G06F 11/0709; G06F 11/0727; G06F 11/1612; G06F 11/2023
  USPC .................... 714/4.11, 6.2, 6.3, 42
  See application file for complete search history.

(56) References Cited

U.S. PATENT DOCUMENTS

| 7,114,094 | B2 * | 9/2006 | Soejima | G06F 11/2028 714/15 |
| 8,327,186 | B2 | 12/2012 | Coatney et al. | |
| 2009/0222498 | A1 * | 9/2009 | Lu | G06F 17/30067 |
| 2009/0287967 | A1 * | 11/2009 | Winokur | G06F 11/1443 714/54 |
| 2012/0166886 | A1 * | 6/2012 | Shankar | G06F 11/2028 714/43 |
| 2014/0047263 | A1 | 2/2014 | Coatney et al. | |

* cited by examiner

*Primary Examiner* — Joseph D Manoskey
(74) *Attorney, Agent, or Firm* — Cooper Legal Group, LLC

(57) ABSTRACT

Techniques for recovering from a failure at a disaster recovery site are disclosed. An example method includes receiving an indication to shift control of a set of volumes of a plurality of volumes. The set of volumes is originally owned by a second storage node. The first storage node is a disaster recovery partner of the second storage node. The method includes shifting control of the set of volumes. The method further includes during the shifting, changing a status of a flag corresponding to a progress of the shifting. The method also includes during a reboot of the first storage node, determining the status of the flag and determining, based on the status of the flag, whether to mount the set of volumes during reboot at the first storage node.

20 Claims, 5 Drawing Sheets

METHOD AND SYSTEM FOR HANDLING FAILURES BY TRACKING STATUS OF SWITCHOVER OR SWITCHBACK

TECHNICAL FIELD

Examples of the present disclosure generally relate to high availability computer systems, and more specifically, relate to handling node failure in high availability data storage.

BACKGROUND

A storage server is a computer system that performs data storage and retrieval for clients over a network. For example, a storage server may carry out read and write operations on behalf of clients while interacting with storage controllers that transparently manage underlying storage resources (e.g., disk pools). Two methods of providing network accessible storage include network-attached storage (NAS) and storage area networks (SANs).

Network-attached storage (NAS) is a file-level storage system that provides clients with data access over a network. In addition, a storage area network (SAN) is a type of specialized high-speed network that interconnects clients with shared storage resources. Either type of distributed storage system may include storage controllers that implement low-level control over a group of storage drives to provide virtualized storage. Storage nodes may include storage servers and/or storage controllers in some examples.

Storage nodes may be clustered together to provide high-availability data access. For example, two storage nodes may be configured so that when one node fails, the other node continues processing without interruption. In addition, another set of clustered storage nodes may exist in a different location for disaster recovery (DR) purposes. In an example, if a node located in the primary site fails, site switchover may occur in which the node's DR partner located at the DR site continues processing operations for the failed node. When the failed node comes back online at a future point in time, site switchback may occur in which control returns to the failed node, which begins to process operations. During DR, however, the DR partner located at the DR site may fail.

BRIEF DESCRIPTION OF THE DRAWINGS

The present disclosure is illustrated by way of example, and not by way of limitation, and can be understood more fully from the detailed description given below and from the accompanying drawings of various examples provided herein. In the drawings, like reference numbers may indicate identical or functionally similar elements. The drawing in which an element first appears is generally indicated by the left-most digit in the corresponding reference number.

DESCRIPTION

Figure 1:
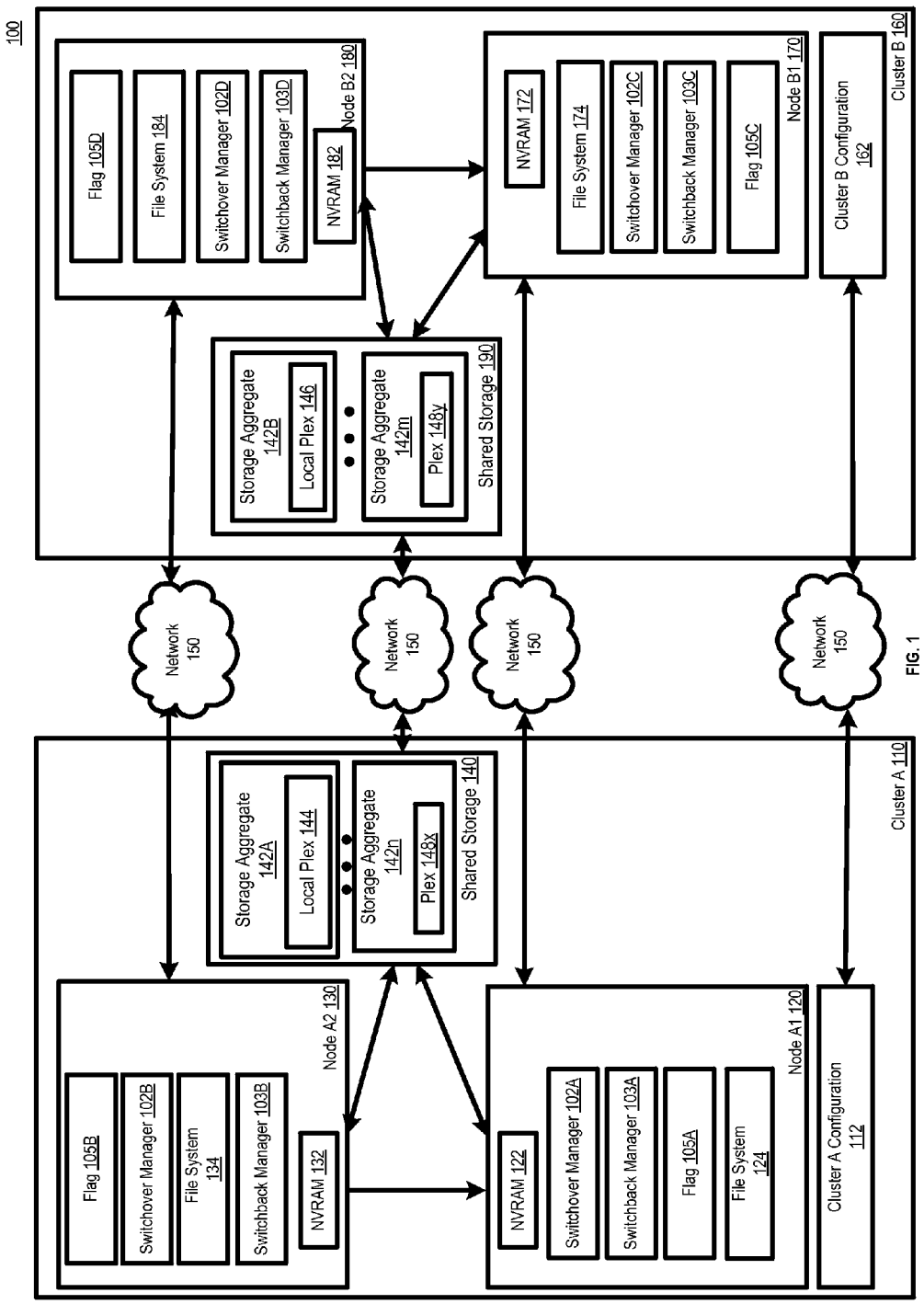
FIG. 1 illustrates an example system architecture for recovering from a failure at a DR site, in accordance with various examples of the present disclosure.

I. Overview
II. Example System Architecture
   A. High-Availability Partners and Disaster Recovery Partners
   B. NVRAM and Mirroring
III. Switchover and Switchback Operations
   A. Switchover Operation
   B. Switchback Operation
   C. Failure May Occur During Switchover Operation or Switchback Operation
IV. Flag Tracks Status of Switchover Operation or Switchback Operation
   A. Cause of Failure
      1. Power Loss
      2. Panic
   B. Switchover Operation
      1. Shift Control of a Set of Volumes From Source Cluster to Destination Cluster
         a. Status of Flag Corresponds to a First Value
         b. Status of Flag Corresponds to a Second Value
      2. Determine Whether to Mount Volumes Based on the Status of the Flag During Boot
   C. Switchback Operation
      1. Shift Control of a Set of Volumes From Destination Cluster to Source Cluster
         a. Status of Flag Corresponds to a Second Value
         b. Status of Flag Corresponds to a First Value
      2. Determine Whether to Mount Volumes Based on the Status of the Flag During Boot
V. Example Method
VI. Example Computing System

I. Overview

Disclosed herein are systems, methods, and computer program products for recovering from a failure at a disaster recovery site.

In an example, two high-availability (HA) storage clusters are configured as disaster recovery (DR) partners at different sites connected via a high-speed network. Each cluster processes its own client requests independently and can assume operations of its DR partner when an outage occurs. Transactions performed on each cluster are replicated to the other respective cluster, thus allowing seamless failover during a site outage.

If a first cluster becomes unavailable, control of a set of volumes originally owned and controlled by the first cluster may be shifted to a second cluster. A first node in the first cluster may be a DR partner of a second node in the second cluster. The second node may keep track of which volumes it originally owns and which were received from other nodes. In an example, the second node receives an indication to shift control of a set of volumes of a plurality of volumes, where the plurality of volumes is owned by the second node, and the set of volumes is originally owned by the first node. Control of the set of volumes may be shifted. As control of the set of volumes is shifted, the second node may change a status of a flag corresponding to a progress of the shifting. The flag may be helpful if the second node fails before the switchover or switchback operation completes. During a reboot of the second node, the second node may determine the status of the flag to know where the second node last left off before the failure occurred. The second node may determine, based on the status of the flag, whether to mount the set of volumes at the second node.

Thus, various embodiments employ a flag to determine ownership (or other type of control) of a volume has been successfully transferred from one node to another. Examples of flags include one or more bits stored persistently to memory of a node, where the one or more bits have a state that represents a progress of the switchover or switchback operation.

Various illustrations of the present disclosure will be understood more fully from the detailed description given below and from the accompanying drawings of various examples described herein. In the drawings, like reference numbers may indicate identical or functionally similar elements. The drawing in which an element first appears is generally indicated by the left-most digit in the corresponding reference number.

II. Example System Architecture

FIG. 1 illustrates an example system architecture 100 for recovering from a failure at a DR site, in accordance with various examples of the present disclosure. System architecture 100 includes cluster A 110, cluster B 160, and network 150.

Any component or combination of components in cluster A 110 or cluster B 160 may be part of or may be implemented with a computing device. Examples of computing devices include, but are not limited to, a computer, workstation, distributed computing system, computer cluster, embedded system, stand-alone electronic device, networked storage device (e.g., a storage server), mobile device (e.g. mobile phone, smart phone, navigation device, tablet or mobile computing device), rack server, storage controller, set-top box, or other type of computer system having at least one processor and memory. Such a computing device may include software, firmware, hardware, or a combination thereof. Software may include one or more applications and an operating system. Hardware may include, but is not limited to, one or more processors, types of memory and user interface displays.

A storage controller is a specialized computing device that provides clients with access to storage resources. A storage controller usually presents clients with logical volumes that appear as a single unit of storage (e.g., a storage drive, such as a solid-state drive (SSD) or a disk). However, logical volumes may be comprised of one or more physical storage drives. For example, a single logical volume may be an aggregation of multiple physical storage drives configured as a redundant array of independent disks (RAID). RAID generally refers to storage technology that combines multiple physical storage drives into a single logical unit, for example, to provide data protection and to increase performance. In an example, a storage server may operate as part of or on behalf of network attached storage (NAS), a storage area network (SAN), or a file server by interfacing with a storage controller and a client. Further, a storage server also may be referred to as a file server or storage appliance.

A. High-Availability Partners and Disaster Recovery Partners

Cluster A 110 includes cluster A configuration 112, node A1 120, node A2 130, and shared storage 140. Cluster B 160 includes cluster B configuration 162, node B1 170, node B2 180, and shared storage 190. A cluster generally describes a set of computing devices that work together for a common purpose while appearing to operate as a single computer system. Clustered computing devices usually are connected via high-speed network technology, such as a fast local area network (LAN) or fibre channel connectivity. Clustering generally may be used, for example, to provide high-performance and high availability computing solutions.

In an example, cluster A 110 is a high availability (HA) cluster at one geographic location or "site" that uses node A1 120 and node A2 130 as a high availability (HA) pair of computing devices to provide access to computer systems, platforms, applications and/or services with minimal or no disruption. Similarly, cluster B 160 also is a high availability (HA) cluster at a different geographic location or "site" than cluster A 110, and uses node B1 170 and node B2 180 as a high availability (HA) pair to provide access to computer systems, platforms, applications and/or services at a different location with minimal or no disruption.

In an example, cluster A 110 and cluster B 160 each may provide users with physical and/or virtualized access to one or more computing environments, networked storage, database servers, web servers, application servers, software applications or computer programs of any type, including system processes, desktop applications, web applications, applications run in a web browser, web services, etc.

While cluster A 110 and cluster B 160 each provide high availability (HA) services for a site, each cluster itself is susceptible to disruptive events that can occur at a particular location. For example, an entire site may become unavailable for one or more various reasons, including an earthquake, a hurricane, a flood, a tornado, a fire, an extended power outage, a widespread network outage, etc. In addition, a site may need to be shutdown periodically for maintenance or other purposes, such as relocation.

To provide additional redundancy and increased resiliency against natural disasters and other events that may impact site availability, cluster A 110 and cluster B 160 may be configured as disaster recovery (DR) partners. In an example, cluster B 160 serves as a DR partner for cluster A 110 (and vice versa). A node in cluster A 110 and a node in cluster B 160 comprise storage nodes in a geographically-distributed cluster.

In an example, cluster A 110 may be located at a first site (e.g., San Francisco) and cluster B 160 may be located at a second site 50-100 miles away (e.g., San Jose). Transactions occurring on cluster A 110 are replicated or copied to cluster B 160 over network 150 and then replayed on cluster B 160 to keep the two clusters synchronized. Thus, when a site outage occurs or cluster A 110 is unavailable for some reason, cluster B 160 may take over operations for cluster A 110 (and vice versa) via an automated or manual switchover.

A switchover generally refers to switching or transferring processing from one computing resource (e.g., a computer system, cluster, network device, etc.) to another redundant or backup computing resource. The terms "switchover" and "switchover operation" generally refer to manual, semi-automated, or automated switchover processing. In an example, forms of automated and semi-automated switchover sometimes may be referred to as "failover."

In the example described above, cluster B 160 serves as a DR partner for cluster A 110. Similarly, cluster A 110 also may serve as a DR partner for cluster B 160. In one example, cluster A 110 and cluster B 160 each may receive and process its own user requests. In such an example, cluster A 110 and cluster B 160 each has its own local clients. Transactions occurring at each respective site may be replicated or copied to the other DR partner, and the DR partner may assume or takeover operations when switchover occurs.

In an example, transactions from one cluster are replicated or copied across a network 150 to a DR partner at a different location. Network 150 may generally refer to a public network (e.g., the Internet), a private network (e.g., a local area network (LAN), a metropolitan area network (MAN), a wide area network (WAN)), fibre channel communication, an inter-switch link, or any combination thereof. In an example, network 150 is a redundant high-speed interconnect between cluster A 110 and cluster B 160.

In an example, configuration information is synchronized with a DR partner to ensure operational consistency in the event of a switchover. For example, cluster configuration data may be indicated by an administrator upon configuration and then periodically updated. Such data may be stored as metadata in a repository that is local to a cluster. However, to provide consistent and uninterrupted operation upon switchover to a DR partner cluster at a different site, configuration information should be synchronized between the clusters.

In an example, cluster A configuration 112 data is synchronized with cluster B configuration 162 data when cluster A 110 and cluster B 160 are DR partners. For example, cluster A configuration 112 data and associated updates may be replicated or copied to cluster B configuration 162 (and vice versa) so that cluster A configuration 112 data and cluster B configuration data 162 are identical and either cluster may assume operations of the other without complication or interruption upon switchover.

In an example, node A1 120 and node A2 130 are computing devices configured as a high availability (HA) pair in cluster A 110. Similarly, node B1 170 and node B2 180 also are configured as a HA pair in cluster B 160. Each of node A1 120, node A2 130, node B1 170 and node B2 180 may be a specialized computing device, such as a storage controller or a computing device that interacts with one or more storage controllers.

A HA pair generally describes two nodes that are configured to provide redundancy and fault tolerance by taking over operations and/or resources of a HA partner to provide uninterrupted service when the HA partner becomes unavailable. In an example, a HA pair may be two storage systems that share multiple controllers and storage. The controllers may be connected to each other via a HA interconnect that allows one node to serve data residing on storage volumes of a failed HA partner node. Each node may continually monitor its partner and mirror non-volatile memory (NVRAM) of its partner. The term "takeover" may be used to describe the process where a node assumes operations and/or storage of a HA partner. Further, the term "giveback" may be used to describe the process where operations and/or storage is returned to the HA partner.

B. NVRAM and Mirroring

In an embodiment, each node in cluster A 110 and cluster B 160 includes its own local random-access memory (RAM) that stores data. In an example, each node in cluster A 110 and cluster B 160 includes its own local copy of non-volatile RAM (NVRAM). For example, node A1 120 includes NVRAM 122, node A2 130 includes NVRAM 132, node B1 170 includes NVRAM 172, and node B2 180 includes NVRAM 182. Non-volatile memory generally refers to computer memory that retains stored information even when a computer system is powered off.

One type of NVRAM is static random access memory (SRAM), which is made non-volatile by connecting it to a constant power source, such as a battery. Another type of NVRAM uses electrically erasable programmable read-only memory (EEPROM) chips to save contents when power is off. EEPROM memory retains contents even when powered off and can be erased with electrical charge exposure. Other NVRAM types and configurations exist and can be used in addition to or in place of the previous illustrative examples.

In an example, when a client performs a write operation, a responding node (e.g., node A1 120) first writes the data to its local NVRAM (e.g., NVRAM 122) instead of writing the data to a storage volume. A node first may write data to local NVRAM and then periodically flush its local NVRAM to storage volume to provide faster performance. NVRAM protects the buffered data in the event of a system crash because NVRAM will continue to store the data even when a node is powered off. Accordingly, NVRAM may be used for operations that are "inflight" such that the inflight operation does not need to be immediately stored to storage volume and an acknowledgement indicating that the operation was processed may be sent to the client. The NVRAM may provide for quicker processing of operations.

A consistency point may refer to the operation of synchronizing the contents of NVRAM to storage volume. In an example, after a certain threshold is exceeded (e.g., time period has elapsed or a particular amount of free memory is available or unavailable in NVRAM), a consistency point may be invoked to synchronize the contents of NVRAM to storage volume. In an example, the data stored in NVRAM that has been flushed to storage volume is marked as dirty and overwritten by new data. In another example, the data stored in NVRAM that has been flushed to storage volume is removed from the NVRAM. While data stored at a partition of NVRAM is being flushed to storage volume, a different portion of the NVRAM may be used to store data (e.g., incoming operations).

To further protect against potential data loss, local NVRAM also may be mirrored to a HA partner. In an example, contents of NVRAM 132 of node A2 130 are replicated or copied to NVRAM 122 of node A1 120 on cluster A 110. Thus, if node A2 130 were to fail, a copy of NVRAM 132 exists in NVRAM 122 and may be replayed (e.g., extracted) and written to storage volume by node A1 120 to prevent data loss.

Similarly, local NVRAM also may be mirrored to a node of another cluster at a different site, such as a DR partner, to provide two-way NVRAM mirroring. For example, NVRAM 132 of node A2 130 may be mirrored, replicated, or copied to both NVRAM 122 of node A1 120 (which is node A2 130's HA partner) and also to NVRAM 182 of node B2 180 (which is node A2 130's DR partner) on cluster B 160. In an example, Cluster A 110 may fail and a system administrator ("administrator") may perform a switchover to cluster B 160. Since node B2 180 has a copy of NVRAM 132 in NVRAM 182 from node A2 130, the replicated data from NVRAM 132 can be replayed (e.g., extracted) and written to storage volume as part of the switchover operation to avoid data loss.

In an example, node B1 170 is not a HA partner of node A1 120 or node A2 130 and is not a DR partner of node A2 130 or of node B2 180. Similarly, node B2 180 is not a HA partner of node A1 120 or node A2 130 and is not a DR partner of node A1 120 or of node B1 170.

In cluster A 110, both node A1 120 and node A2 130 access shared storage 140. Shared storage 140 of cluster A 110 includes storage aggregates 142A . . . 142n. Similarly, both node B1 170 and node B2 180 access shared storage 190 of cluster B 160. Shared storage 190 of cluster B 160 includes storage aggregates 142B . . . 142m. In one example, shared storage 140 and shared storage 190 may be part of the same storage fabric, providing uninterrupted data access across different sites via high speed metropolitan and/or wide area networks.

The various embodiments are not limited to any particular storage drive technology and may use, e.g., Hard Disk Drives (HDDs) or SSDs, among other options for aggregates 142 and 192. Storage aggregate 142A includes local plex 144, and storage aggregate 142B includes remote plex 146 (from the perspective of a node in cluster A 110). A plex generally describes storage resources used to maintain a copy of mirrored data. In one example, a plex is a copy of a file system. Plexes of a storage aggregate may be synchronized, for example, using simultaneous updates or replication, so that the plexes are maintained as identical.

Storage aggregates 142n and 142m generally represent that a plurality of storage aggregates may exist across different sites. For example, each general storage aggregate may be comprised of multiple, synchronized plexes (e.g., an instance of plex 148x and an instance of plex 148y) in different locations.

In an example, plex 144 and plex 146 include the same number of disks. When the storage aggregate corresponding to node A1 120 and node B1 170 is created, the same number of disks is selected from a first disk pool (e.g., plex 144) and a second disk pool (e.g., plex 146). The first and second disk pools make up the storage aggregate. In an example, five disks from the first disk pool and five disks from the second disk pool make up the storage aggregate, and the pair of five disks mirrors each other. In such an example, when a write is issued at cluster A 110, the write operation ripples to the five disks from the second disk pool at cluster B 160.

Some storage aggregates are owned by a node in one location (e.g., cluster A 110), while other storage aggregates are owned by another node in a different location (e.g., cluster B 160). In one example, a node in cluster A 110 (e.g., node A1 120) owns a storage aggregate (e.g., storage aggregate 142A, 142B). The storage aggregate includes a local plex 144 in cluster A 110 and a remote plex 146 in cluster B 160, which also are owned by node A1 120. In one example, node A1 120 writes to the plexes, which may not be accessed by disaster recover partner node B1 170 until ownership of the storage aggregate and plexes are changed, for example, as part of a switchover.

As an example, plex locality is generally descriptive and usually based on a plex's location relative to a controlling node (e.g., a node that owns the storage aggregate associated with the plex). For example, a plex associated with cluster A 110 would be local to a controlling node in cluster A 110 while a plex in cluster B 160 would be remote to the controlling node in cluster A 110. Similarly, plex locality would be reversed when the controlling node is located in cluster B 160.

In an example, storage aggregate 142A and storage aggregate 142B each is part of a single storage aggregate spanning across sites (e.g., cluster A 110 and cluster B 160). In one example, a storage aggregate is created as a synchronized RAID mirror. A synchronized RAID mirror generally refers to a configuration where different copies of mirrored data are kept in sync, for example, at a single location or across different sites (e.g., geographic locations). In addition, RAID generally refers to storage technology that combines multiple storage drives into a logical unit for data protection and faster performance.

In an example, storage aggregate 142A and storage aggregate 142B belong to the same storage aggregate owned by a single node. In one example, node A2 130 owns storage aggregates 142A and 142B and writes data to local plex 144. The data updates then are replicated to cluster B 160 and applied to remote plex 146 to keep local plex 144 and remote plex 146 synchronized. Thus, when a switchover occurs, a DR partner has a mirrored copy of the other site's data and may assume operations of the other site with little or no disruption.

Figure 2:
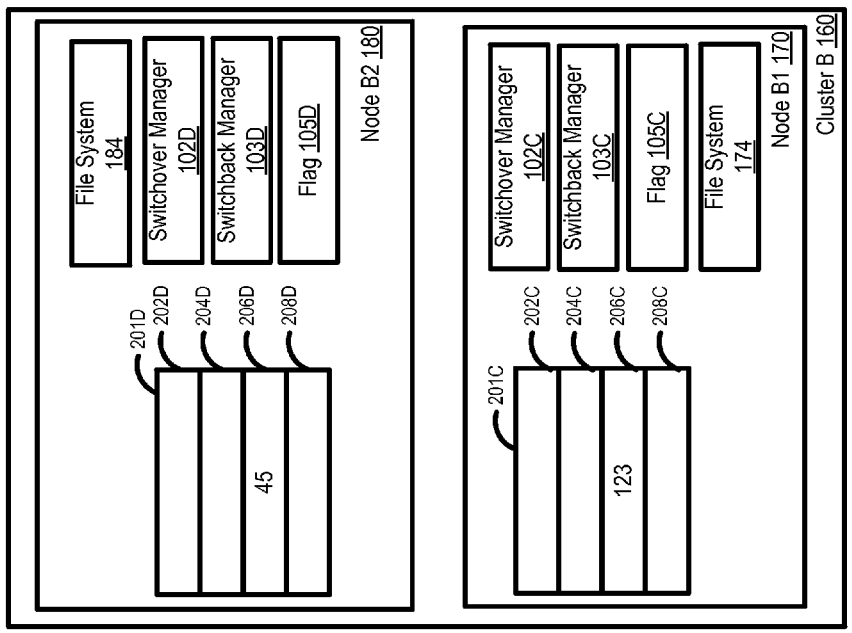
FIG. 2 illustrates an example system architecture for mirroring data stored in a local NVRAM of a node to another node, in accordance with various examples of the present disclosure.
Figure 2:
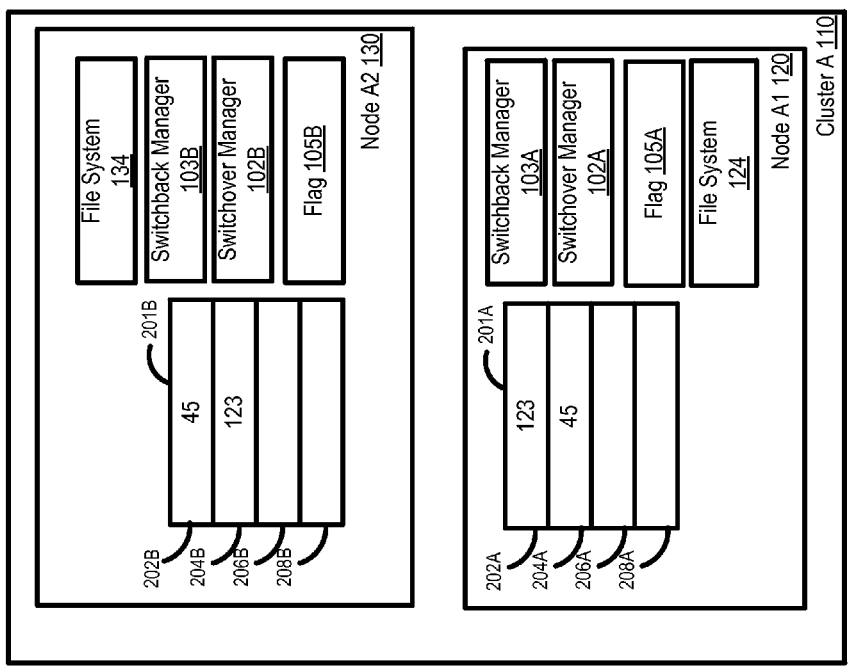

FIG. 2 illustrates an example system architecture 200 for mirroring data stored in a local NVRAM of a node to another node, in accordance with various examples of the present disclosure. System architecture 200 includes cluster A 110, which includes node A1 120 and node A2 130, and cluster B 160, which includes node B1 170 and node B2 180.

Each node may include a local NVRAM 201 (e.g., NVRAM) that is divided into a plurality of partitions. In the example illustrated in FIG. 2, the local NVRAM of each node is divided into four partitions. For example, node A1 120 includes a first partition 202A, second partition 204A, third partition 206A, and fourth partition 208A. First partition 202A may be a local partition that stores buffered data for node A1 120. Second partition 204A may be a partition that is dedicated to storing a copy of the contents stored in the local partition of an HA partner's local NVRAM (e.g., the local partition of node A2 130's local NVRAM). Third partition 206A may be a partition that is dedicated to storing a copy of the contents stored in the local partition of a DR partner's local NVRAM (e.g., the local partition of node B1 170's local NVRAM). The terms "third partition" and "DR partition" may be used interchangeably throughout the disclosure. Fourth partition 208A may be a working area used to hold data as it is flushed to storage volume or to store data during and after a switchover. This description of the local NVRAM also applies to node A2 130, node B1 170, and node B2 180 and each of their respective local NVRAMs.

In FIG. 2, node A1 120 receives operations "1", "2", and "3" from a client and stores these operations into a log in local NVRAM 201A before writing the operations to storage volume. Node A1 120 mirrors a plurality of operations to node A2 130 (node A1 120's HA partner) and to node B1 170 (node A1 120's DR partner). In an example, the contents of the log stored in local NVRAM 201A of node A1 120 are synchronously mirrored to node A2 130 and node B1 170. For example, the contents stored in first partition 202A of local NVRAM 201A are mirrored to second partition 204B of local NVRAM 201B at node A2 130, which stores a copy of the contents of the log (operations "1", "2", and "3") at second partition 204B. Additionally, the contents stored in first partition 202A of local NVRAM 201A are mirrored to third partition 206C of local NVRAM 201C at node B1 170, which stores a copy of the contents of the log (operations "1", "2", and "3") at third partition 206C. A consistency point may be invoked that flushes the contents stored in the log to storage volume.

Additionally, node A2 130 receives operations "4" and "5" from a client and stores these operations into a log in local NVRAM 201B before writing the operations to storage volume. Node A2 130 mirrors a plurality of operations to node A1 120 (node A2 130's HA partner) and to node B2 180 (node A2 130's DR partner). In an example, the contents of the log stored in local NVRAM 201B of node A2 130 are synchronously mirrored to node A1 120 and node B2 180. For example, the contents stored in first partition 202B of local NVRAM 201B are mirrored to second partition 204A of local NVRAM 201A at node A1 120, which stores a copy of the contents of the log (operations "4" and "53") at second partition 204A. Additionally, the contents stored in first partition 202B of local NVRAM 201B are mirrored to third partition 206D of local NVRAM 201D at node B2 180, which stores a copy of the contents of the log (operations "4" and "5") at third partition 206D.

III. Switchover and Switchback Operations

Referring back to FIG. 1, node A1 120, node A2 130, node B1 170 and node B2 180 each includes a respective switchover manager (e.g., switchover managers 102A, 102B, 102C, and 102D, respectively) and a switchback manager (e.g., switchback managers 103A, 103B, 103C, and 103D, respectively). Switchover manager 102A-102D is computer software that manages switchover operations between cluster A 110 and cluster B 160. Switchback manager 103A-102D is computer software that manages switchback operations between cluster A 110 and cluster B 160. In an example, switchover manager 102A-102D and/or switchback manager 103A-103D may be part of an operating system (OS) running on a node, may include one or more extensions that supplement core OS functionality, and also may include one or more applications that run on an OS. In one example, switchover manager 102A-102D and/or switchback manager 103A-103D is provided as part of a storage OS that runs on a node.

In the example illustrated in FIG. 1, node A1 120, node A2 130, node B1 170 and node B2 180 each includes a respective file system (e.g., file system 124, file system 134, file system 174 and file system 184). A file system generally describes computer software that manages organization, storage, and retrieval of data. A file system also generally supports one or more protocols that provide client access to data. In some examples, a write-anywhere file system, such as the Write Anywhere File Layout (WAFL®) may be used. In an example, various switchover manager operations or switchback manager operations may be implemented independent of a file system, as part of a file system, or in conjunction with a file system. In one example, a switchover manager uses file system information and features (e.g., file system attributes and functionality) when performing a switchover. In another example, a switchback manager uses file system information and features (e.g., file system attributes and functionality) when performing a switchback.

A. Switchover Operation

When a site outage occurs or cluster A 110 is unavailable for some reason, cluster B 160 may take control over operations for cluster A 110 via a switchover. During a switchover from cluster A 110 to cluster B 160, node B1 170 may assume operations of node A1 120's volumes with little or no disruption. Similarly, during a switchover from cluster A 110 to cluster B 160, node B2 180 may assume operations of node A2 130's volumes with little or no disruption. The switchover from cluster A 110 to cluster B 160 may be transparent to clients, and cluster B 160 may provide the same services as cluster A 110 with little or no interruption.

Referring to FIG. 1, a switchover manager on cluster B 160 (e.g., switchover manager 102C or switchover manager 102D) may perform a switchover from cluster A 110 to cluster B 160 by shifting control of a set of volumes (e.g., synchronized RAID mirror volumes) in shared storage 190 from a node on cluster A 110 to a node on cluster B 160 (e.g., node B1 170 or node B2 180). In an example, an administrator may issue the switchover command from node B1 170. Before the switchover command is issued from node B1 170, cluster A 110 may be the owner of and have control of a set of volumes. The switchover command may be an indication to node B1 170 to shift control of the set of volumes from cluster A 110 to cluster B 160.

Responsive to the switchover command, node B1 170 may shift control of the set of volumes from node A1 120 to node B1 170 by changing the ownership of the set of volumes from node A1 120 to node B1 170, mounting the set of volumes (originally owned by node A1 120) at node B1 170, replaying the contents in node B1 170's local NVRAM that stores operations from node A1 120, and then flushing the local NVRAM contents to storage volume. In an example, node B1 170 changes the ownership of the set of volumes by changing ownership of one or more storage aggregates (e.g., storage aggregates 142B) and corresponding volumes (e.g., synchronized RAID mirror volumes) in shared storage 190 from a node in cluster A 110 to a node in cluster B 160 (e.g., node B1 170 or node B2 180). After storage aggregate and volume ownership changes, the transitioned volumes are initialized when brought online with cluster B 160 node as the owner. Further, any buffered data previously replicated from NVRAM on cluster A 110 (e.g., NVRAM 122 or NVRAM 132) to NVRAM on cluster B 160 (e.g., NVRAM 172 or NVRAM 182) is replayed on volumes of storage aggregate 142B. After the switchover is complete, node B1 170 has control of the set of volumes and treats the set of volumes as node B1 170 treats its own local volumes. Client requests for node A1 120 are redirected to node B1 170, which processes the requests for node A1 120's clients.

B. Switchback Operation

After cluster A 110 has recovered from its outage, cluster B 160 may switch back operations to cluster A 110 via a switchback. In an example, after being aware of cluster A 110's unavailability and the switchover to cluster B 160, the administrator may start recovery of cluster A 110. For example, the administrator may replace a controller or NVRAM at cluster A 110. A switchback manager on cluster B 160 (e.g., switchback manager 103C or switchback manager 103D) may perform a switchback from cluster B 160 to cluster A 110 by shifting control of the set of volumes (e.g., synchronized RAID mirror volumes) in shared storage 190 from a node on cluster B 160 back to a node on cluster A 110 (e.g., node A1 120 or node A2 130).

In an example, the administrator may issue the switchback command from node B1 170. Before the switchback command is issued from node B1 170 and in keeping with the above example, cluster B 160 is the owner of and has control of the set of volumes originally owned by cluster A 110. The switchback command may be an indication to node B1 170 to shift control of the set of volumes from node B1 170 back to node A1 120.

Responsive to the switchback command, node B1 170 may shift control of the set of volumes from node B1 170 to node A1 120 by flushing the contents in node B1 170's local NVRAM to storage volume, unmounting the set of volumes originally owned by cluster A 110 from node B1 170, and changing the ownership of the set of volumes to node A1 120. In an example, node B1 170 changes the ownership of the set of volumes by changing ownership of one or more storage aggregates (e.g., storage aggregates 142B) and corresponding volumes (e.g., synchronized RAID mirror volumes) in shared storage 190 from a node in cluster B 160 to a node in cluster A 110 (e.g., node A1 120 and node A2 130). After storage aggregate and volume ownership changes, the transitioned volumes are initialized when brought online with cluster A 110 node as the owner. After the switchback is complete, node A1 120 has control of the set of volumes and processes its client requests.

C. Failure May Occur During Switchover Operation or Switchback Operation

While control of the set of volumes is in the process of being shifted from one cluster to another cluster (e.g., during switchover or switchback), however, a failure may occur at the DR site. For example, at any point while node B1 170 performs the actions to shift control of the set of volumes, node B1 170 may fail. Node B1 170 may fail for a variety of reasons such as, for example, panic or power loss. A panic may occur, for example, if a volume cannot be recovered. A panic may be caused by a software error or an unexpected exceptional error case. Accordingly, it may be possible for the DR node to not complete the switchover operation. After the DR node fails, it may reboot. Upon reboot, it may be desirable for the DR storage node to know where it left off in the switchover or switchback process before the failure so that the DR storage node may recover quickly.

If a DR node (e.g., node B1 170 or node B2 180) fails during switchover or switchback, the DR node reboots and then performs the switchover recovery or the switchback recovery process (whichever one is applicable).

IV. Flag Tracks Status of Switchover Operation or Switchback Operation

The present disclosure provides a mechanism for a DR node to keep track of the progress of the switchover or switchback operation being handled by the node. In FIG. 1, each of node A1 120, node A2 130, node B1 170, and node B2 180 has a flag 105A-105D, respectively. The flag may be stored in each of the local NVRAMs of the respective nodes as well as the storage volume. Accordingly, the flag is persistent and its value is not lost when a failure occurs. In an example, the flag is stored in at least one of a local NVRAM of a node and a local disk of the node.

In an embodiment, the respective flag is a global state within each node, and a node changes the status of its flag based on the progress of the switchover or switchback operation. An advantage of using the flag may be that upon reboot of the DR node, the flag reduces the time it takes for the DR node to recover from a failure that occurred during a switchover or switchback operation because the DR node recognizes where it left off in the switchover or switchback operation.

In an example, a status of flag 105C corresponds to a first value and changes based on a progression of the switchover or switchback operation. In an example, the switchover operation may include performing a plurality of actions. Node B1 170 may determine whether the change a status of flag 105C corresponding to a progress of execution of the plurality of actions. When the node is initialized after boot, node B1 170 may set flag 105C to the first value. After completion of a first action of the plurality of actions, node B1 170 may change the status of flag 105C to correspond to a second value that is different from the first value. After completion of a second action, which is subsequent to the first action, node B1 170 may then change the status of flag 105C to correspond back to the first value. Thus, when node B1 170 reboots after a failure, node B1 170 may check the status of flag 105C to determine how far node B1 170 progressed in the switchover operation before node B1 170 failed. For example, upon reboot, if the status of the flag corresponds to the second value, node B1 170 may determine that it had completed the second action before failure occurred. This description also applies to the switchback process.

Additionally, although the status of a flag is described as corresponding to two values, this is not intended to be limiting and in other embodiments a status of a variable may correspond to more than two values (e.g., three, four, five, or more values) that indicate the progress of switching control of the set of volumes. Further, the following description describes actions that are performed that cause node B1 170 to change the status of flag 105C. This is merely an example, and other actions are within the scope of the disclosure.

A. Cause of Failure

In an embodiment, if node B1 170 fails during switchover, upon reboot node B1 170 may be able to determine what caused the failure. For example, upon reboot, node B1 170 may determine that the cause of the failure was a power loss. In another example, upon reboot, node B1 170 may determine that the cause of the failure was a panic. In an example, if node B1 170 fails before replay (e.g., before mounting the first set of volumes, while attempting to mount the first set of volumes, or after mounting the first set of volumes that is originally owned by node A1 120), upon reboot, node B1 170 may determine what caused the failure. At this point, flag 105C is still set to the first value and has not changed since it was set to the first value.

1. Power Loss

If upon reboot, node B1 170 determines that the failure was caused by a power loss, node B1 170 may retry the switchover. Node B1 170 may retry the switchover up to a threshold number of failures.

2. Panic

In contrast, if upon reboot, node B1 170 determines that the failure was caused by a panic, node B1 170 abandons the switchover and invokes an early switchback, which returns control of the first set of volumes originally owned by node A1 120 back to it. At this point, the status of flag 105C still corresponds to the first value and has not changed since it was set to the first value. The term "early switchback" may refer to invoking the switchback operation early due to the panic. Early switchback may occur without intervention from the administrator. The panic may have been caused by a software or hardware error or an unexpected exceptional error case, which are typically not able to be processed after a retry. Accordingly, it may be disadvantageous to retry the switchover after determining that the failure was caused by a panic because node B1 170 may enter a panic loop. A panic loop would not only cause a data outage for node A1 120's local clients but would also cause a data outage for node B1 170's local clients.

At early switchback, node A1 120's local NVRAM may still store its own local content. If A1 120's local NVRAM still stores its own local content, it may be unnecessary to replay operations corresponding to the stored content from node B1 170. Regardless of whether node A1 120 is online or offline, node B1 170 may still invoke the early switchback to return control of the set of volumes back to node A1 120. Accordingly, whether node A1 120 is online or not is independent of invocation of the early switchback. In another example, if node B1 170 fails before replay of the contents in the DR partition of its local NVRAM, upon reboot, node B1 170 invokes an early switchback regardless of the cause of the failure. In another example, if node B1 170 fails before replay of the contents in the DR partition of its local NVRAM, upon reboot, node B1 170 retries the switchover regardless of the cause of the failure.

B. Switchover Operation

Figure 3:
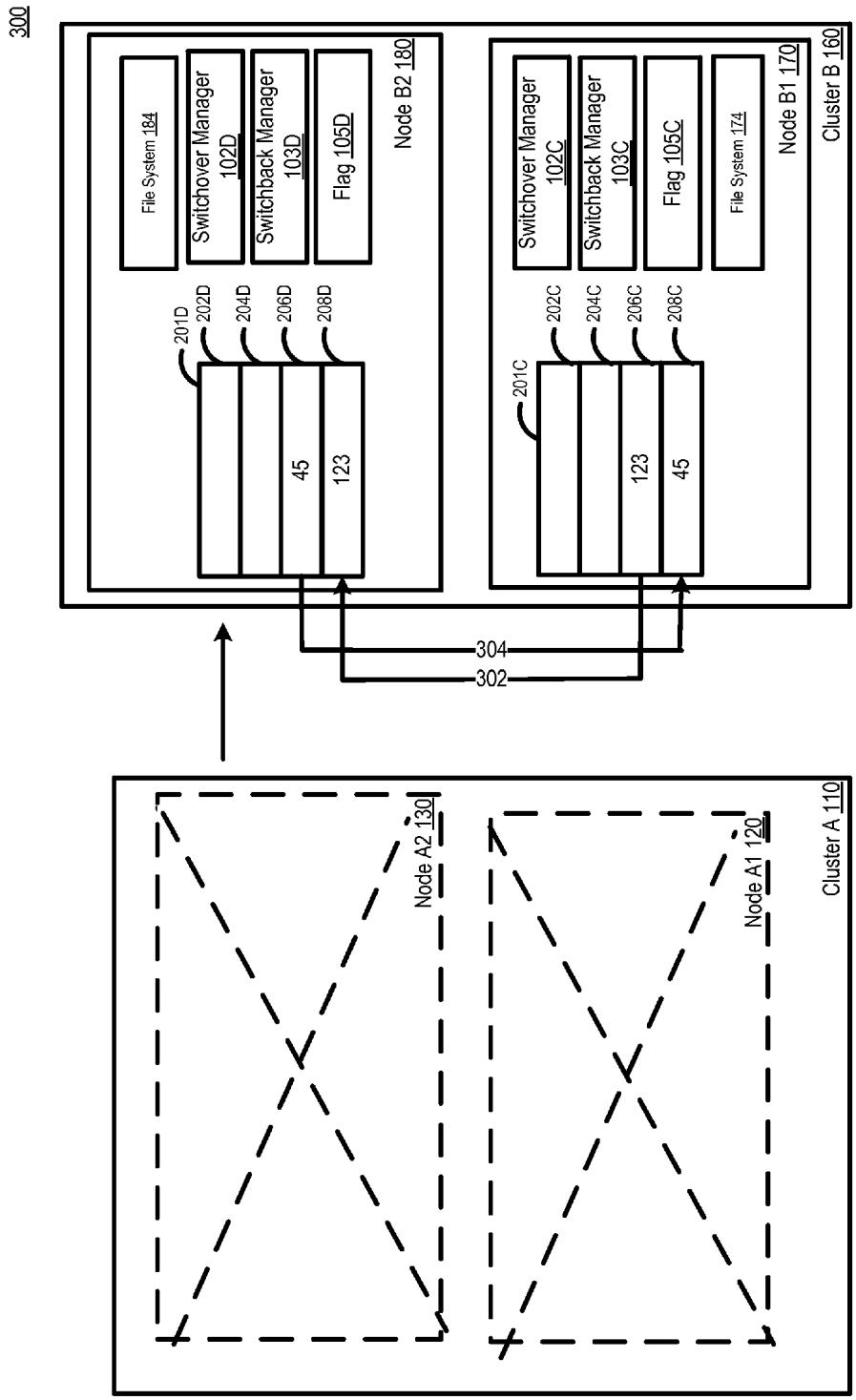
FIG. 3 illustrates a switchover from a cluster to another cluster, in accordance with various examples of the present disclosure.

FIG. 3 illustrates a switchover from cluster A 110 to cluster B 160, in accordance with various examples of the present disclosure. In FIG. 3, cluster A 110 has failed, as indicated by the dashed lines. When cluster A 110 fails, cluster B 160 may assume or takeover operations when switchover occurs. In an example, an administrator invokes switchover functionality by issuing a switchover command using a command line or graphical user interface (GUI). For example, the administrator may issue the switchover command either prior to or after an outage occurs on a cluster at a specific site to transfer operations from the cluster to another cluster at a different site. In an example, a planned or unplanned outage may occur at the site of cluster A 110. In some examples, site switchover may occur in response to an outage or other condition detected by a monitoring process. For example, a monitoring process running at a DR site or another non-local site may trigger a switchover when site availability is disrupted or site performance is inadequate.

An administrator issues a switchover command from a node on cluster B 160 to invoke switchover manager functionality that transfers operations from cluster A 110 to cluster B 160. The switchover may be performed by node B1 170 and/or node B2 180. For example, the administrator may issue the switchover command either from node B1 170 to invoke switchover manager 102C or from node B2 180 to invoke switchover manager 102D, regardless of which node is configured as the master node for cluster B 160. In an example, the switchover command is issued from node B1 170. Responsive to the switchover command, node B1 170 receives an indication to shift control of a set of volumes of a plurality of volumes from cluster A 110 to cluster B 160. In such an example, the set of volumes may be originally owned by node A1 120, which may be a DR partner of node B1 170.

1. Shift Control of a Set of Volumes from Source Cluster to Destination Cluster

The switchover command may be the indication to shift control of the set of volumes from cluster A 110 to cluster B 160. In an embodiment, during shifting of the control of the set of volumes in switchover, node B1 170 changes a status of flag 105C, which corresponds to node B1 170's progress in shifting control of the set of volumes from node A1 120 to node B1 170. Accordingly, if node B1 170 fails while shifting control of the set of volumes from node A1 120 to node B1 170, during the reboot of node B1 170, it may determine the status of flag 105C and determine, in accordance with the status of the flag, what to do with the set of volumes that is originally owned by node A1 120 (e.g., whether to mount or not to mount the set of volumes).

During the switchover operation, contents from a DR node located in the DR site are copied to the DR node's HA partner, which is also located in the DR site. In an example, contents from node B1 170 are copied to node B2 180 and contents from node B2 180 are copied to node B1 170. In FIG. 3, as indicated by an arrow 302, the contents stored in third partition 206C of local NVRAM 201C at node B1 170 are copied to fourth partition 208D of local NVRAM 201D at node B2 180. In particular, the operations "1", "2", and "3" stored in third partition 206C of local NVRAM 201C at node B1 170 are copied to fourth partition 208D of local NVRAM 201D at node B2 180.

a. Status of Flag Corresponds to a First Value

Similarly, as indicated by an arrow 304, the contents stored in third partition 206D of local NVRAM 201D at node B2 180 are copied to fourth partition 208C of local NVRAM 201C at node B1 170. In particular, the operations "4" and "5" stored in third partition 206D of local NVRAM 201D at node B2 180 are copied to fourth partition 208C of local NVRAM 201C at node B1 170. This may ensure that each of node B1 170 and node B2 180 has the most current operations that have been applied. In keeping with the above example in which node B1 170 sets flag 105C to the first value when the node is initialized for the first time after boot, after the contents of node B1 170 and node B2 180 have been copied to each other, the status of flag 105C still corresponds to the first value and has not been changed. The example in which the node is initialized for the "first time" after boot may refer to the node's state before the failure.

Switchover manager 102C may perform a switchover by changing ownership of one or more storage volumes to a recovery node of a DR partner, writing replicated/mirrored buffer data received from a failed node to disk, and bringing the volumes online with the recovery node as the owner. During the switchover, the ownership of a storage node's volume (e.g., one or more disks in storage aggregate 142A) in cluster A 110 is changed to a storage node in cluster B 160. In an example, the ownership of node A1 120's storage volumes is changed to node B1 170, and the ownership of node A2 130's storage volumes is changed to node B2 180. Switchover manager 102C may change ownership of a storage aggregate, one or more plexes in the storage aggregate, and associated volumes and storage drives from a node on cluster A 110 to a node on cluster B 160 (or vice versa depending on the direction of the switchover). In keeping with the above example, at this point when ownership has changed, the status of flag 105C still corresponds to the first value and has not been changed.

To shift control of a set of volumes in response to a switchover operation, the DR partner (e.g., node B1 170) mounts the newly localized volumes, replays the DR partition of its local NVRAM, and flushes the contents from the local NVRAM to storage volume. In an example, node B1 170 may attempt to mount a first set of volumes that is originally owned by node A1 120 (node B1 170's DR partner), and node B2 180 may attempt to mount a second set of volumes that is originally owned by node A2 130 (node B2 180's DR partner). After a point in time in which the DR nodes have successfully mounted the first and second sets of volumes but before node B1 170 finishes replay and flush contents from the DR partition of the DR nodes' local NVRAMs to storage volume, the status of flag 105C may still correspond to the first value, which has not been changed since the switchover command was issued.

After node B1 170 successfully mounts the first set of volumes that is originally owned by node A1 120, node B1 170 may initiate the replay of operations stored in partition 206C and mirrored from node A1 120 to node B1 170 (e.g., operations "1", "2", and "3"). Similarly, after node B2 180 successfully mounts the second set of volumes that is originally owned by node A2 130, node B2 180 may initiate the replay of operations stored in partition 206D and mirrored from node A2 130 to node B2 180 (e.g., operations "4" and "5"). After a point in time in which node B1 170 replayed the operations mirrored from the DR nodes' DR partners but before the DR nodes have successfully flushed the contents based on the replay to storage volume, the status of flag 105C may still correspond to the first value, which has not been changed since the switchover command was issued.

After a DR node replays its DR partner's operations, the DR node may flush the contents replayed from the DR node's local NVRAM (e.g., from node B1 170's DR partition or node B2 180's DR partition) to storage volume. In an example, after node B1 170 replays operations "1", "2" and "3", node B1 170 may flush the contents replayed from DR partition 206C to storage volume.

b. Status of Flag Corresponds to a Second Value

After node B1 170 and node B2 180 replay their local NVRAM's DR partitions and successfully flush the contents replayed from the DR partition to storage volume but before the switchover is complete, a node may change the status of flag 105C and 105D respectively to correspond to a second value, which is different from the first value. In an example, the node that changes the status of flag 105C is the same DR node from which the switchover command was issued. In another example, the node that changes the status of flag 105C is the last DR node that flushes contents from its DR partition to storage volume. In such an example, each DR node that is a DR partner of a node at the source site may provide an indication (e.g., in a data structure) of whether the DR node has flushed the appropriate contents to storage volume.

To complete the switchover, after the contents stored in DR partition 206C of node B1 170 and DR partition 206D of node B2 180 are replayed and successfully flushed to storage volume, a node (e.g., node B1 170 or node B2 180) switches control of the volumes owned by cluster A 110 to cluster B 160. For example, node B1 170 may switch control of the first set of volumes originally owned by node A1 120 to node B1 170 and may switch control of the second set of volumes originally owned by node A2 130 to node B2 180. After the switchover is complete, node B1 170 treats the first set of volumes as node B1 170 treats its own local volumes. Client requests for node A1 120 are redirected to node B1 170, which processes the requests for node A1 120's clients. Similarly, node B2 180 treats the second set of volumes as node B2 180 treats its own local volumes. Client requests for node A2 130 are redirected to node B2 180, which processes the requests for node A2 130's clients.

The first set of volumes (originally controlled and owned by node A1 120) is brought online at the DR site with node B1 170 as the owner and is up-to-date with the most recent operations affecting the first set of volumes and accepted from node A1 120's clients. Similarly, the second set of volumes (originally controlled and owned by node A2 130) is brought online at the DR site with node B2 180 as the owner and is up-to-date with the most recent operations affecting the second set of volumes and accepted from node A2 130's clients.

As discussed, the above description is merely an example of actions that may cause node B1 170 to change the status of flag 105C. Other actions are within the scope of the disclosure. It may be useful for node B1 170 to change the status of flag 105C such that it corresponds to a progress of what actions node B1 170 has already performed to recover node A1 120's volumes. Accordingly, if node B1 170 fails before the switchover is complete, upon reboot, node B1 170 may check the status of flag 105C to know where it last left off in the switchover operation. If a DR node fails, it reboots. Upon reboot, the DR node typically mounts all the volumes that it owns and performs any necessary processing on the volumes (e.g., replay and flushes contents to storage volume).

2. Determine Whether to Mount Volumes Based on the Status of the Flag During Boot If a DR node (e.g., node B1 170 or node B2 180) fails during switchover, the DR node reboots and then performs the switchover recovery process. By using the flag (e.g., flag 105C), the DR node may avoid mounting a set of volumes that is originally owned by a node located in cluster A 110 if the status of the flag corresponds to the first value. If the DR partition of NVRAM 201C at node B1 170 (e.g., partition 206C) was not replayed during the previous switchover operation, the status of the flag may correspond to the first value. In an example, during boot of node B1 170, if the set of volumes that is originally owned by a node located in cluster A 110 is mounted, it should have replayed the DR partition of NVRAM 201C at node B1 170 in the previous switchover; otherwise, data loss may occur because the consistency point on volumes would have moved forward.

After the contents stored in DR partition 206C of node B1 170 and DR partition 206D of node B2 180 are replayed and successfully flushed to storage volume but before the switchover is complete, the status of flag 105C corresponds to the second value. In keeping with the above example, if node B1 170 fails at any time after its contents in local NVRAM 201C are replayed and successfully flushed to storage volume but before the switchover operation is completed, the status of flag 105C corresponds to the second value, which is an indication to node B1 170 that cluster B 160 may still be processing the volumes originally owned by cluster A 110. In contrast, if node B1 170 fails at any time before its contents in local NVRAM 201C are replayed and successfully flushed to storage, the status of flag 105C corresponds to the first value, which is an indication to node B1 170 that no operations have yet been replayed and successfully flushed to storage volume. If node B1 170 fails after the switchover is complete, volumes originally owned by the node located in cluster A 110 are fully localized, and the flag value does not need to be consulted.

In a scenario in which the status of the flag corresponds to the first value, node B1 170 has not applied any changes to the first set of volumes and also has not served any data from the first set of volumes originally owned by node A1 120. To enable a DR node to recover quickly, the DR node may mount its own local volumes and determine to omit mounting the volumes originally owned by cluster A 110.

Accordingly, node B1 170 may use flag 105C to determine whether the replay was finished and successfully flushed to storage volume and may accordingly determine whether to mount volumes originally owned by a node in cluster A 110. During a reboot of a DR node in cluster B 160, the DR node determines the status of flag 105C. In an embodiment, node B1 170 determines, based on the status of the flag, whether to mount the first set of volumes originally owned by node A1 120. In an example, node B1 170 owns a plurality of volumes including a first set of volumes that is originally owned by node A1 120 and a second set of volumes that is not originally owned by node A1 120. One or more volumes of the second set of volumes may be originally owned by node B1 170. The first set of volumes is mutually exclusive of the second set of volumes, and the first and second sets may be currently owned by node B1 170.

Upon node B1 170's reboot from a panic, if the status of flag 105C corresponds to the first value, node B1 170 determines to not mount the first set of volumes and returns control the first set of volumes back to node A1 120. In such an example, if the status of flag 105C corresponds to the first value, node B1 170 may omit mounting the first set of volumes and only mount the second set of volumes.

Node B1 170 may keep track of which volumes are originally owned by which storage nodes and may mount only its own local volumes. Node B1 170 may exclude the mounting of the first set of volumes during boot because, for example, the latest operations were not applied to the first set of volumes or it may be time consuming for node B1 170 to mount the first set of volumes just to unmount them thereafter if the first set of volumes is going to be immediately switched back. If node B1 170 did not apply any new operations to the first set of volumes, it would be a waste of resources to mount the first set of volumes because the next action would be to unmount the first set of volumes (without applying any operations to the first set of volumes). Accordingly, during the reboot of node B1 170 from a panic, the first set of volumes is kept offline and not brought online. In this way, node B1 170 may avoid mounting and unmounting the first set of volumes and then sending the first set of volumes back to node A1 120, thus saving time and computing cycles. By avoiding unnecessary mounts and unmounts of volumes owned by node A1 120, node B1 170 may quickly bring up its own local volumes and the outage window for node B1 170 is reduced, allowing node B1 170 to serve its own clients more quickly.

Upon node B1 170's reboot, if the status of flag 105C corresponds to the second value, node B1 170 determines to mount the first set of volumes that is originally owned by node A1 120. In such an example, if the status of flag 105C corresponds to the second value, node B1 170 may mount the first and second sets of volumes. Node B1 170 may mount the first and second sets of volumes because, for example, node B1 170 is still processing the first set of volumes.

As discussed, if upon reboot, node B1 170 determines that the failure was caused by a power loss, node B1 170 may retry the switchover. Node B1 170 may retry the switchover up to a threshold number of failures.

C. Switchback Operation

Operations that have been switched over to cluster B 160 may be switched back to cluster A 110, for example at a later time, after a recovery of node A1 120 or node A2 130 in cluster A 110. In an example, a switchback manager on cluster B 160 (e.g., switchover manager 103C or switchover manager 103D) performs a switchback from cluster B 160 to cluster A 110 by synchronizing one or more volumes (e.g., synchronized RAID mirror volumes) in shared storage 190 with one or more volumes in shared storage 140 and shifting control of a set of volumes in shared storage 190 from cluster B 160 to a node on cluster A 110 (e.g., node A1 120 or node A2 130).

Cluster A 110 may recover and cluster B 160 may return control of operations that cluster B 160 had taken over for cluster A 110 when the switchover from cluster A 110 to cluster B 160 occurred. In an example, an administrator invokes switchback functionality by issuing a switchback command using a command line or GUI. An administrator issues a switchback command from a node on cluster B 160 to invoke switchback manager functionality that transfers operations from cluster B 160 back to cluster A 110. The switchback may be performed by node B1 170 and/or node B2 180. For example, the administrator may issue the switchback command either from node B1 170 to invoke switchback manager 103C or from node B2 180 to invoke switchback manager 103D, regardless of which node is configured as the master node for cluster B 160.

In an example, the switchback command is issued from node B1 170. Responsive to the switchback command, node B1 170 receives an indication to shift control of a set of volumes of a plurality of volumes from cluster B 160 to cluster A 110. In such an example, the plurality of volumes may be owned by node B1 170, the set of volumes may be originally owned by node A1 120, and node A1 120 may be a DR partner of node B1 170. The switchback command may be the indication to shift control of the set of volumes from cluster B 160 to cluster A 110.

1. Switch Control of a Set of Volumes from Destination Cluster to Source Cluster In an embodiment, during shifting control of the set of volumes in switchback, node B1 170 changes a status of flag 105C corresponding to node B1 170's progress in shifting control of the first set of volumes from node B1 170 to node A1 120. Accordingly, in switchback, if a DR node (e.g., node B1 170 or node B2 180) fails while shifting control of a set of volumes back to the DR node's DR partner located at cluster A 110, during the reboot of the DR node, the switchback manager (e.g., switchback manager 103C or switchback manager 103D) may determine the status of a flag (e.g., flag 105C or flag 105D) and determine, in accordance with the status of the flag, what to do with volumes that the DR node currently owns but does not originally own.

To shift control of a set of volumes in response to a switchback operation, node B1 170 may stop accepting new requests from node A1 120's clients, finish processing pending requests from node A1 120's clients, synchronize node B1 170's data with node A1 120's data, perform a clean unmount (e.g., flush contents to storage volume and unmount volumes), and change ownership of volumes back to the original owner.

a. Status of Flag Corresponds to a Second Value

When the switchback command is issued, node B1 170 may set the status of flag 105C to correspond to the second value, which indicates that cluster B 160 is still processing volumes originally owned by cluster A 110. As discussed above, if node B1 170 fails and upon node B1 170's reboot, if the status of flag 105C corresponds to the second value, node B1 170 determines to mount the first set of volumes originally owned by node A1 120 because cluster B 160 is still processing the first set of volumes. In such a scenario, node B1 170 may mount a plurality of volumes including the first set of volumes and a second set of volumes, where the plurality of volumes is owned by node B1 170 and the second set of volumes are not originally owned by node A1 120. The second set of volumes may be volumes that are originally owned by node B1 170.

Additionally, when the switchback command is issued at node B1 170, node B1 170 may stop accepting new client requests from node A1 120's clients and finish processing pending requests that node B1 170 has already accepted and not yet completed. Node B1 170 may also send a communication to node B2 180 to stop accepting new client requests from node A2 130's clients and instruct node B2 180 to finish processing pending requests that node B2 180 has already accepted and not yet completed.

During the switchback, node A1 120 and node B1 170 may synchronize their data. In an embodiment, data in plex 146 (which is located at cluster B 160) is synchronized with plex 144 (which is located at cluster A 110). In an example, before performing a clean shutdown as will be discussed below, all changes in plex 146 are synchronized with plex 144. Of course, as noted above, the scope of embodiments is not limited to disks and may include any storage technology, such as solid-state drives (SDDs) and the like.

Additionally, during the switchback, node B1 170 performs a clean unmount on the first set of volumes originally owned by node A1 120. To perform the clean unmount, node B1 170 may flush the contents replayed from the DR partition for the first set of volumes in node B1 170's local NVRAM to storage volume and then unmount the first set of volumes. During the switchback, node B2 180 may also perform a clean unmount on the second set of volumes originally owned by node A2 130. To perform the clean unmount, node B2 180 may flush the contents replayed from the DR partition for the second set of volumes in node B1 170's local NVRAM to storage volume and then unmount the second set of volumes.

b. Status of Flag Corresponds to a First Value

After node B1 170 unmounts the first set of volumes, node B1 170 may change the status of flag 105C to correspond to the first value. Here, it is unnecessary for node A1 120 or node A2 130 to replay any operations and no data loss occurs because the last client operation that was accepted has already been replayed and the contents (replayed from the DR partition) have been flushed to storage volume at node B1 170 or node B2 180. As discussed above, if node B1 170 fails and upon node B1 170's reboot, if the status of flag 105C corresponds to the first value, node B1 170 determines to not mount the first set of volumes originally owned by node A1 120 and returns control the first set of volumes back to node A1 120. In such an example, if the status of flag 105C corresponds to the first value, node B1 170 may omit mounting the first set of volumes and only mount the second set of volumes, where the second set of volumes is owned by node B1 170 and is not originally owned by node A1 120. Further, during switchback, ownership of the first set of volumes is switched back to node A1 120 and ownership of the second set of volumes is switched back to node A2 130.

Each of node A1 120 and node B1 170 may keep a consistency point count that is incremented when a consistency point occurs. In an example, if data has been served out of node B1 170 or node B1 170 flushes its contents to storage volume, the consistency point counter at node B1 170 may be incremented. Accordingly, the consistency point counter at node B1 170 may be greater than the consistency point counter at node A1 120. If node B1 170's consistency point counter does not match node A1 120's consistency point counter (e.g., node B1 170's consistency point counter is greater than node A1 120's consistency point counter), then the content in node A1 120's local NVRAM may be discarded because it is stale. Rather than use the stale data, node A1 120 may load data from the storage volume to which node B1 170 had flushed data. As illustrated in FIG. 1, node A1 120 and node B1 170 may share storage. After ownership of the first set of volumes has changed from node B1 170 to node A1 120, node A1 120 may see the most recent data.

If the set of volumes that is originally owned by a node located in cluster A 110 is cleanly unmounted during the previous switchback operation, the status of the flag may correspond to the first value. If the set of volumes is not mounted during boot of node B1 170, then it may be unnecessary to unmount the set of volumes during retry switchback. Additionally, if the status of the flag corresponds to the second value during the switchover operation, replay from the DR partition of NVRAM 201C at node B1 170 is complete and the set of volumes that is originally owned by a node located in cluster A 110 behaves like a volume that is local to node B 170. From that point, one or more new operations may have been logged in the local partition of NVRAM 201C at node B1 170 even before the switchover operation is complete.

2. Determine Whether to Mount Volumes Based on the Status of the Flag During Boot In an example, if node B1 170 fails during switchback, node B1 170 retries to perform the switchback operation. If node B1 170 fails again during the retry, node B1 170 may shift control of the set of volumes originally owned by node A1 120 from node B1 170 back to node A1 120. In an example, during a reboot, node B1 170 determines the status of flag 105C. Node B1 170 may determine, based on the status of the flag, whether to mount the set of volumes (originally owned by node A1 120) at node B1 170 or to omit mounting the set of volumes.

In an example, node B1 170 owns a plurality of volumes including a first set of volumes that is originally owned by node A1 120 and a second set of volumes that is not originally owned by node A1 120. The first set of volumes is mutually exclusive of the second set of volumes, and the first and second sets may be currently owned and controlled by node B1 170. Upon node B1 170's reboot, if the status of flag 105C corresponds to the second value, node B1 170 determines to mount the first and second sets of volumes. If, however, the status of flag 105C corresponds to the first value, node B1 170 determines to omit mounting the first set of volumes that is originally owned by node A1 120. In such an example, it may be unnecessary for node B1 170 to flush contents from its local NVRAM to storage volume because node B1 170 has finished processing the contents associated with node A1 120. Accordingly, it may be a waste of time and resources to mount the first set of volumes because no further operations will be applied to the first set of volumes.

Although the flag is described as being a global state within a node, it should be understood that this is not intended to be limiting. In another embodiment, the flag is maintained on a per-volume basis. In such an embodiment, upon reboot of node B1 170, it determines to mount only the volumes for which a status of the flag of a volume corresponds to the second value.

V. Example Method

Figure 4:
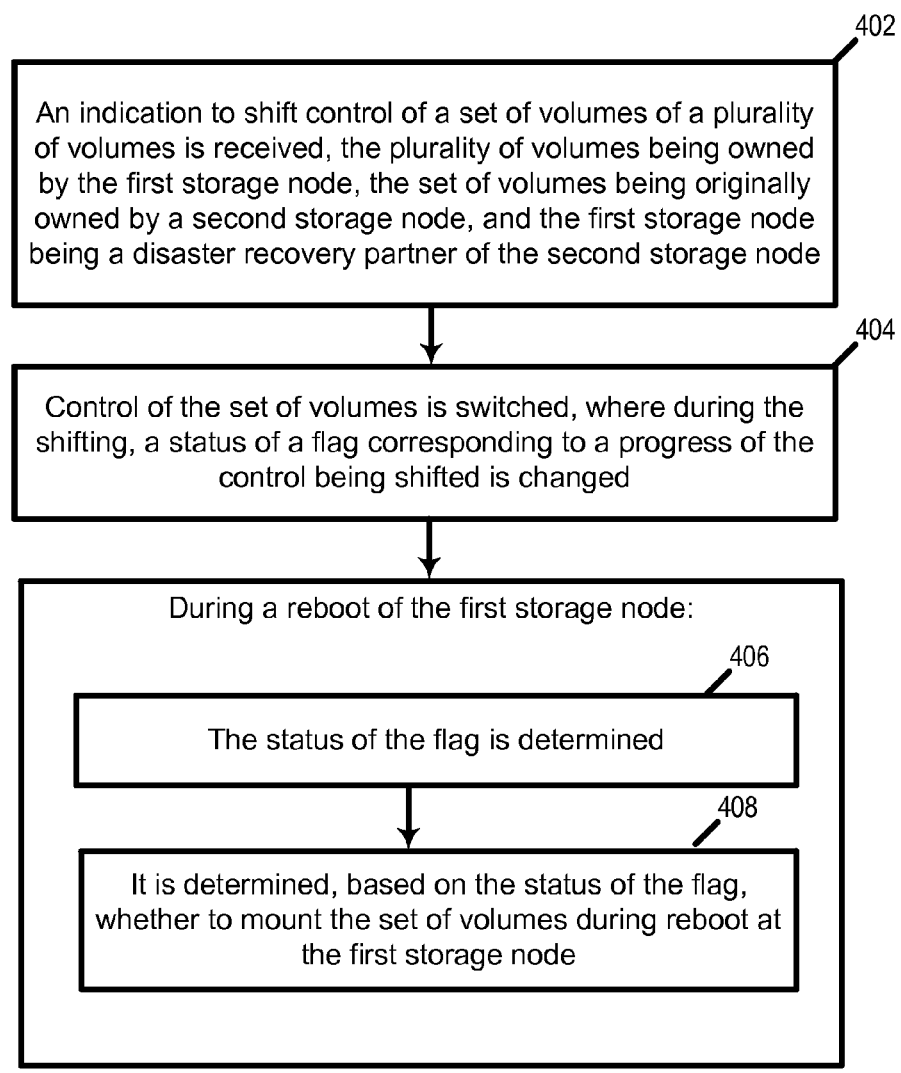
FIG. 4 is a flow diagram illustrating an example of a method of recovering from a failure at a disaster recovery site, in accordance with various examples of the present disclosure.

FIG. 4 is a flow diagram illustrating an example of a method 400 of recovering from a failure at a disaster recovery site, in accordance with various examples of the present disclosure. Method 400 may be performed by processing logic that may comprise hardware (circuitry, dedicated logic, programmable logic, microcode, etc.), software (such as instructions run on a general purpose computer system, a dedicated machine, or processing device), firmware, or a combination thereof. In an example, method 400 is performed by a switchover manager of a computer system or storage controller (e.g., one of switchover manager 102A-102D of FIG. 1). In another example, method 400 is performed by a switchback manager of a computer system or storage controller (e.g., one of switchover manager 103A-103D of FIG. 1).

Method 400 begins at a block 402. At block 402, an indication to shift control of a set of volumes of a plurality of volumes is received, the set of volumes being originally owned by the second storage node, and the first storage node being a disaster recovery partner of the second storage node. The indication may come from an administrator who issues a switchover command at a switchover manager in cluster B 160 or who issues a switchback command at a switchback manager in cluster B 160. The indication may also come from a monitoring process running at a DR site or another non-local site that triggers a switchover when site availability is disrupted or site performance is inadequate. The monitoring process may detect an outage or other condition that indicates that a site switchover should occur.

In an example, switchover manager 102C receives an indication (e.g., from an administrator or a monitoring process) to shift control of a set of volumes of a plurality of volumes from node A1 120 to node B1 170, the set of volumes being originally owned by node A1 120, which is a DR partner of node B1 170. In another example, switchover manager 103C receives an indication (e.g., from an administrator or a monitoring process) to shift control of a set of volumes of a plurality of volumes from node B1 170 to node A1 120, the set of volumes being originally owned by node A1 120, which is a DR partner of node B1 170.

At a block 404, control of the set of volumes is shifted, where during the shifting, a status of a flag corresponding to a progress of the shifting is changed. In an example, switchover manager 102C shifts control of the set of volumes, where during the shifting, node B1 170 changes a status of flag 105C corresponding to a progress of the shifting. In another example, switchback manager 103C shifts control of the set of volumes, where during the shifting, node B1 170 changes a status of flag 105C corresponding to a progress of the shifting.

During a reboot of the first storage node, blocks 406 and 408 may be performed. At a block 406, the status of the flag is determined. At a block 408, it is determined, based on the status of the flag, whether to mount the set of volumes during reboot at the first storage node. In an example, node B1 170 determines, based on the status of flag 105C, whether to mount the set of volumes at node B1 170. If node B1 170 determines to mount the set of volumes at node B1 170, node B1 170 may mount, during the reboot, the set of volumes at node B1 170.

In response to a switchover, switchover manager 102C may set flag 105C to a first value. In an example, during the switchover, node B1 170 may replay contents in DR partition 206C and flush them to storage volume. If contents in DR partition 206C have not yet been flushed to storage volume, the status of flag 105C still corresponds to the first value. If, however, contents in DR partition 206C have been flushed to storage volume and the switchover operation is not yet complete, node B1 170 changes the status of flag 105C to correspond to the second value. After the switchover operation is complete, node B1 170 has control of the first set of volumes originally owned by node A1 120 and changes the status of flag 105C to correspond to the first value.

In response to a switchback, switchback manager 103C may set flag 105C to the second value. In an example, during the switchback, node B1 170 flushes contents to storage value and unmounts the first set of volumes originally owned by node A1 120. If the first set of volumes has been successfully unmounted, node B1 170 changes the status of flag 105C to correspond to the first value. If, however, the first set of volumes has not been successfully unmounted, the status of flag 105C still corresponds to the second value.

During reboot, node B1 170 may determine the status of flag 105C to determine where node B1 170 left off before failure occurred. If the status of the flag corresponds to the first value, node B1 170 mounts a second set of volumes, where the second set of volumes does not include the first set of volumes originally owned by node A1 120. The second set of volumes includes volumes that are not originally owned by node A1 120. If, however, the status of the flag corresponds to the second value, node B1 170 mounts a second set of volumes, where the second set of volumes includes the first set of volumes originally owned by node A1 120.

VI. Example Computing System

Figure 5:
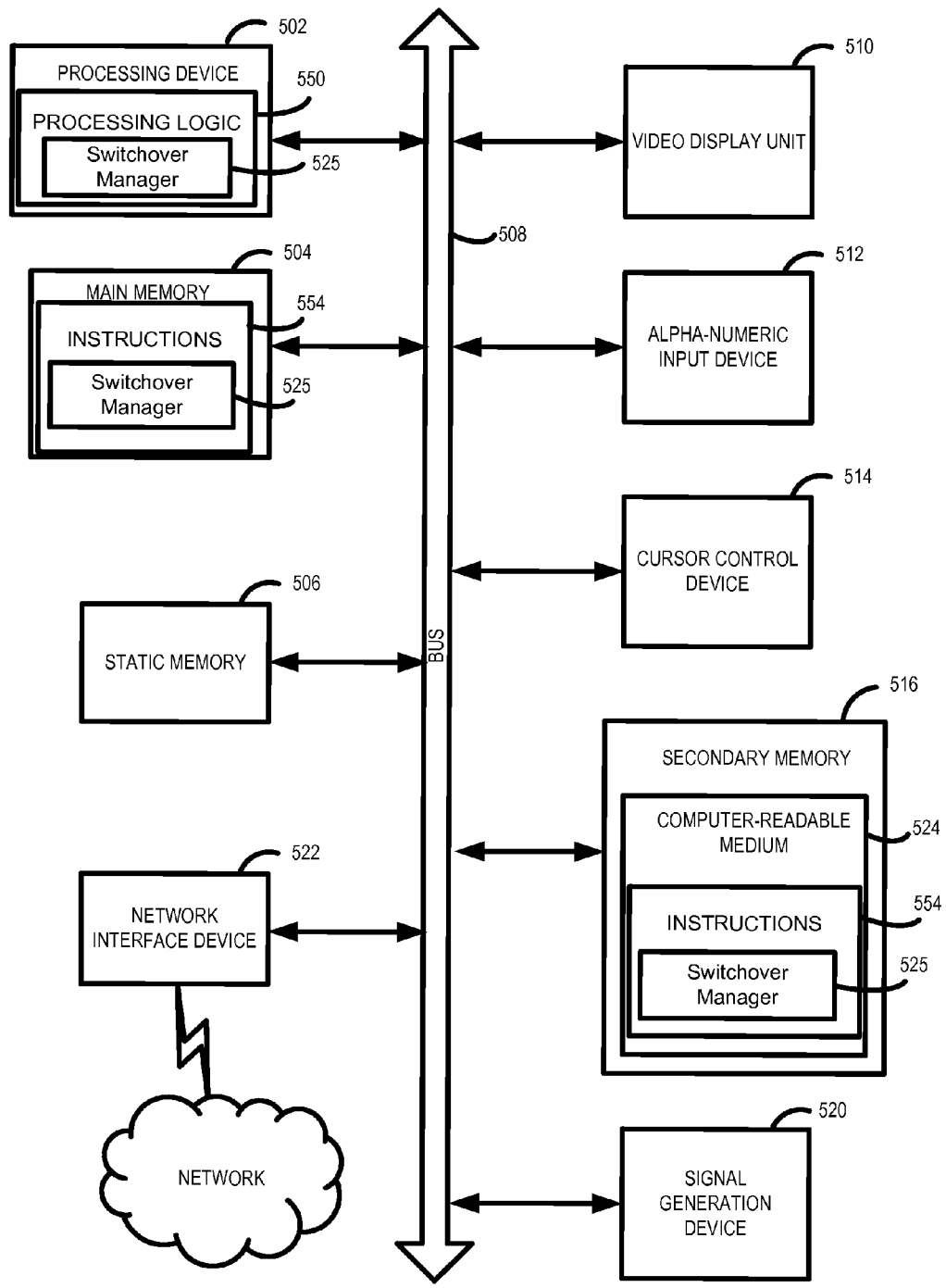
FIG. 5 illustrates a diagrammatic representation of a machine in the example form of a computer system.

FIG. 5 illustrates a diagrammatic representation of a machine in the exemplary form of a computer system 500 within which a set of instructions, for causing the machine to perform any one or more of the methodologies discussed herein, may be executed. In an example, computer system 500 may correspond to a node (e.g., node A1 120, node A2, 130, node B1 170, or node B2 180) in system architecture 100 of FIG. 1.

In examples of the present disclosure, the machine may be connected (e.g., networked) to other machines via a Local Area Network (LAN), a metropolitan area network (MAN), a wide area network (WAN)), a fibre channel connection, an inter-switch link, an intranet, an extranet, the Internet, or any combination thereof. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a storage controller, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device), which communicate with each other via a bus 508.

The processing device 502 represents one or more general-purpose processing devices such as a microprocessor, central processing unit, or the like. The processing device may include multiple processors. The processing device 502 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

In an example involving a storage controller, a video display unit 510, an alphanumeric input device 512, and a cursor control device 514 are not part of the storage controller. Instead, an application running on a client or server interfaces with a storage controller, and a user employs a video display unit 510, an alphanumeric input device 512, and a cursor control device 514 at the client or server.

The secondary memory 516 may include a machine-readable storage medium (or more specifically a computer-readable storage medium) 524 on which is stored one or more sets of instructions 554 embodying any one or more of the methodologies or functions described herein (e.g., switchover manager 525). The instructions 554 may also reside, completely or at least partially, within the main memory 504 and/or within the processing device 502 during execution thereof by the computer system 500 (where the main memory 504 and the processing device 502 constitute machine-readable storage media).

While the computer-readable storage medium 524 is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the operations or methodologies of the present disclosure. The term "computer-readable storage medium" shall accordingly be taken to include, but not be limited to, solid-state memories, and optical and magnetic media.

The computer system 500 additionally may include a switchover manager module (not shown) for implementing the functionalities of a switchover manager (e.g., switchover manager 102A, switchover manager 102B, switchover manager 102C, or switchover manager 102D of FIG. 1). The modules, components and other features described herein (for example, in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices have been shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "storing", "computing", "shifting", "performing", "writing", "providing," "failing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples and implementations will be apparent to those of skill in the art upon reading and understanding the above description. The scope of the disclosure should therefore be determined with reference to the appended claims, along with the full scope of equivalents to which such claims are entitled.

What is claimed is:

1. A method, comprising:
   receiving, at a first storage node that is a disaster recovery partner of a second storage node, an indication to shift control of a set of volumes from the second storage node, originally owning the set of volumes, to the first storage node;
   shifting control of the set of volumes, wherein during the shifting, setting a status of a flag indicative of progress of the shifting before a failure of the first storage node; and
   during a reboot of the first storage node in response to the failure of the first storage node:
      determining the progress of the shifting before the failure of the first storage node based upon the status of the flag; and
      determining whether to mount or omit mounting of the set of volumes during the reboot at the first storage node based upon the status of the flag.

2. The method of claim 1, wherein the determining whether to mount the set of volumes comprises:
   when the status of the flag is determined to correspond to a first value, determining to mount the set of volumes at the first storage node; and
   when the status of the flag is determined to correspond to a second value, determining to omit the mounting of the set of volumes at the first storage node.

3. The method of claim 1, comprising:
   mounting a second set of volumes at the first storage node, wherein when it is determined to mount the first set of volumes at the first storage node, the second set of volumes includes the first set of volumes originally owned by the second storage node, and when it is determined to omit the mounting of the first set of volumes at the first storage node, the second set of volumes excludes the first set of volumes.

4. The method of claim 1, wherein the receiving an indication to change ownership includes receiving an instruction to switchover to a disaster recovery site including the first storage node.

5. The method of claim 1, wherein a local NVRAM of the first storage node includes a partition that corresponds to the second storage node, and wherein during a switchover operation of the set of volumes from the second storage node to the first storage node:
   the status of the flag begins at a first value;
   when contents in the partition of the local NVRAM of the first storage node are replayed and synchronized with the set of storage volumes, the status of the flag is changed to a second value; and
   when the switchover operation is complete, the status of the flag is changed to the first value.

6. The method of claim 1, comprising:
   during a switchback operation of the set of volumes from the first storage node to the second storage node:
      the status of the flag status begins at a first value;
      when a switchback command is issued, the status of the flag is changed to a second value; and
      when the set of volumes is successfully unmounted from the first storage node, the status of the flag is changed to the first value.

7. The method of claim 1, wherein the first storage node and the second storage node comprise storage nodes in a geographically-distributed storage network.

8. The method of claim 1, wherein the flag is persistent and is stored in at least one of a local NVRAM of the first storage node and a local disk of the first storage node.

9. A computing device for recovering from a failure at a disaster recovery site, comprising:
   a memory containing machine readable medium comprising machine executable code having stored thereon instructions for performing a method; and
   a processor coupled to the memory, the processor configured to execute the machine executable code to cause the processor to:
      receive an indication to shift control of a set of volumes from a second storage node, original owning the set of volumes, to a first storage node that is a disaster recovery partner of the second storage node;
responsive to the indication to shift control of the set of volumes, execute a first action;
after execution of the first action, set a status of a flag to correspond to a first value indicative of progress of the shifting before a failure of the first storage node; and
during a reboot of the first storage node in response to the failure of the first storage node:
determine the progress of the shifting before the failure of the first storage node based upon the status of the flag; and
determine whether to mount or omit mounting of the set of volumes during the reboot at the first storage node based on the status of the flag.

10. The computing device of claim 9, wherein the machine executable code causes the processor to:
responsive to the indication to shift control of the set of volumes, execute a second action; and
after execution of the second action, set the status of the flag to correspond to a second value that is different from the first value.

11. The computing device of claim 10, wherein the machine executable code causes the processor to:
when the second action is executed, change the status of the flag to correspond from the first value to the second value.

12. The computing device of claim 11, wherein the machine executable code causes the processor to:
when the first action is executed, change the status of the flag to correspond from the second value to the first value.

13. The computing device of claim 9, wherein the indication is based on a switchover operation of the set of volumes from the second storage node to the first storage node.

14. The computing device of claim 13, comprising:
while performing the switchover operation:
the status of the flag begins at the first value;
when a local NVRAM of the second storage node is flushed to a storage volume, the status of the flag is changed to a second value; and
when the switchover operation is complete, the status of the flag is changed to the first value.

15. The computing device of claim 14, wherein the machine executable code causes the processor to:
mount a second set of volumes at the first storage node, wherein when the status of the flag is set to the second value, the second set of volumes includes the first set of volumes, and wherein when the status of the flag is set to the first value, the second set of volumes excludes the first set of volumes.

16. The computing device of claim 9, comprising:
receiving a second indication to perform a switchback operation of the set of volumes from the first storage node to the second storage node.

17. The computing device of claim 9,
while performing a switchback operation of the set of volumes from the first storage node to the second storage node:
the status of the flag begins at the first value;
when a switchback command is issued, the status of the flag is changed to a second value; and
when the set of volumes is successfully unmounted from the first storage node, the status of the flag is changed to the first value.

18. The computing device of claim 9, wherein the flag is persistent and is stored within a local NVRAM of the first storage node.

19. A non-transitory computer-readable medium having instructions recorded thereon, that when executed by a processor, cause the processor to perform operations, comprising:
receiving an indication to shift control of a set of volumes from a second storage node, originally owning the set of volumes, to a first storage node that is a disaster recovery partner of the second storage node;
while shifting control of the set of volumes, setting a status of a flag indicative of progress of the shifting; and
during a reboot of the first storage node:
determining the progress of the shifting before a failure of the first storage node based upon the status of the flag; and
determining whether to mount or omit mounting of the set of volumes during the reboot at the first storage node based on the status of the flag.

20. The non-transitory computer-readable medium of claim 19, wherein during a switchover operation of the set of volumes from the second storage node to the first storage node: the flag status begins at a first value; when a local NVRAM is flushed to a storage aggregate of the second storage node, the flag status is changed to a second value; and when the switchover operation is complete, the flag status is changed to the first value, and wherein during a switchback operation of the set of volumes from the first storage node to the second storage node: the flag status begins at the first value; when a switchback command is issued, the flag status is changed to the second value; and when the first volume is successfully unmounted from the second storage node, the flag status is changed to the first value.

* * * * *